United States Patent [19]
Iijima

[11] Patent Number: 4,879,710
[45] Date of Patent: Nov. 7, 1989

[54] OPTICAL DISC PROTECTOR AND METHOD FOR APPLYING SAME

[76] Inventor: Mutsuo Iijima, 7-15 Ichiba Higashi Nakamachi, Tsurumi-ku, Yokohama City, Kanagawa, Japan

[21] Appl. No.: 183,923

[22] Filed: Apr. 20, 1988

[51] Int. Cl.$^4$ ............................................... G11B 7/24
[52] U.S. Cl. .................................... 369/291; 369/283; 369/284; 369/286; 369/292
[58] Field of Search ...................... 369/77.2, 291, 292, 369/283, 284, 286; 206/309, 312, 316, 444; 360/133

[56] References Cited

U.S. PATENT DOCUMENTS

| | | | |
|---|---|---|---|
| 3,961,656 | 6/1976 | Aggarwal | 369/291 |
| 4,327,830 | 5/1982 | Patel et al. | 206/312 |
| 4,556,968 | 12/1985 | Pelkey et al. | 369/284 |
| 4,590,493 | 5/1986 | Inoue et al. | 369/284 |
| 4,683,562 | 7/1987 | Matsui et al. | 369/286 |

FOREIGN PATENT DOCUMENTS 959076  5/1964  United Kingdom ................ 369/291

Primary Examiner—Steven L. Stephan
Attorney, Agent, or Firm—Blakely, Sokoloff, Taylor & Zafman

[57] ABSTRACT

A semi-permanent disc protector for shielding an optical disc against surface scratches. The disc protector comprises a transparent annular sheet of a cellulose triacetate film having an inner ring of adhesive adjacent to the center hole of the protector and an outer ring of adhesive adjacent to the outer circumference of the protector. The protector may be applied to either side of an optical disc. When applied to the data-read side of a disc, the rings of adhesive are so disposed that they do not obscure the data region of the disc. The disc protector is applied to the disc with the aid of a centering adapter that insures concentricity of the disc and protector.

6 Claims, 1 Drawing Sheet

OPTICAL DISC PROTECTOR AND METHOD FOR APPLYING SAME

FIELD OF THE INVENTION

This invention relates to the protection of optical discs and, particularly, to the protection of compact discs from surface scratches.

PRIOR ART

Optical discs, and especially those commonly known as compact discs (CD's), are widely used as a non-volatile storage medium for audio and video programs and other data. Such discs have an aluminum-coated pit track containing data that is encased by protective layers of polycarbonate plastic on both the label (non-read) side and data-read side. The plastic's optical characteristics enable the optical laser pickup to be focused on the pit track through the data-read side of the disc. However, if the plastic surface on the data-read side becomes scratched, permanent mistracking and skipping problems can occur due to the laser beam becoming misdirected. In addition, severe scratches on either side of the disc that penetrate to the pit track can destroy the data contained therein.

Previous attempts to provide surface protection for compact discs have been limited to plastic protective shields which are applied to the label side of the disc. However, such shields cannot be applied to the data-read side of the disc. Attempts to do so have been unsuccessful for several reasons. First of all, the type and thickness of material used on such shields distorts and/or attenuates the compact disc player's laser beam, thus causing a loss or degradation of data. Another unresolved problem is that of adhering the shield to the disc without interfering with the data being read by the compact disc player's optical laser pickup. Previously designed shields are adhered to the disc's surface by applying adhesive to the entire shield surface. Such a shield is impractical for protecting the data side since the adhesive interferes with the data being read.

SUMMARY OF THE INVENTION

The present invention provides a semi-permanent disc protector for shielding an optical disc against surface scratches. The disc protector comprises a transparent annular sheet of a cellulose triacetate film having an inner ring of adhesive adjacent to the center hole of the protector and an outer ring of adhesive adjacent to the outer circumference of the protector. The rings of adhesive are disposed such that the disc protector may be applied to the data-read side of the disc without loss or degradation of data due to distortion of the laser beam by the presence of an adhesive layer in the data region of the disc.

The present invention further provides a convenient method for applying the disc protector so as to ensure proper concentric alignment of the protector and disc. A centering adapter is inserted into the center spindle hole of the disc. The centering adapter has a shoulder portion that rests on the surface of the disc over which the center hole of the disc protector fits. Concentricity of the protector and disc to which it is applied is thereby assured.

BRIEF DESCRIPTIONS OF THE DRAWINGS

DETAILED DESCRIPTION OF THE PREFERRED EMBODIMENT

A semi-permanent disc protector having particular application to the protection of compact discs from surface scratches is disclosed. In the following description, for purposes of explanation and not limitation, certain specific numbers, dimensions, materials, etc. are set forth in order to provide a thorough understanding of the present invention. However, it will be apparent to one skilled in the art that the present invention may be practiced without these specific details.

Figure 1:
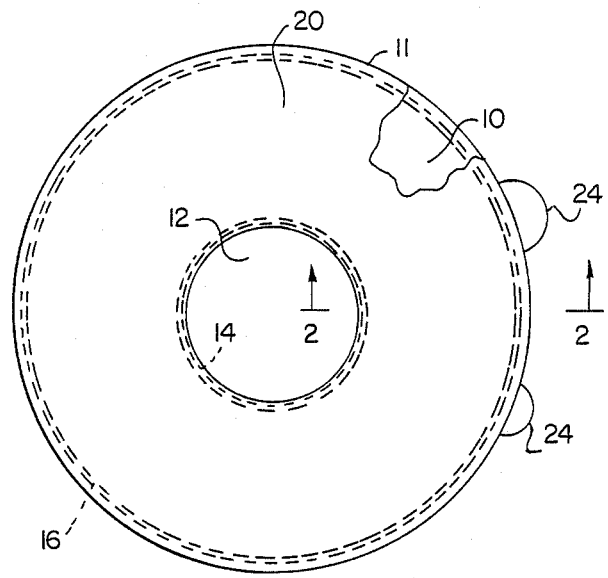
FIG. 1 is a plan view of a disc protector according to the present invention.
Figure 2:
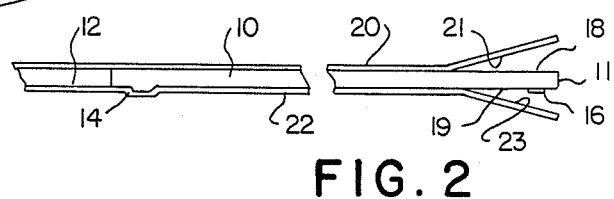
FIG. 2 is a partial cross-sectional view taken through line 2—2 of FIG. 1.
Figure 3:
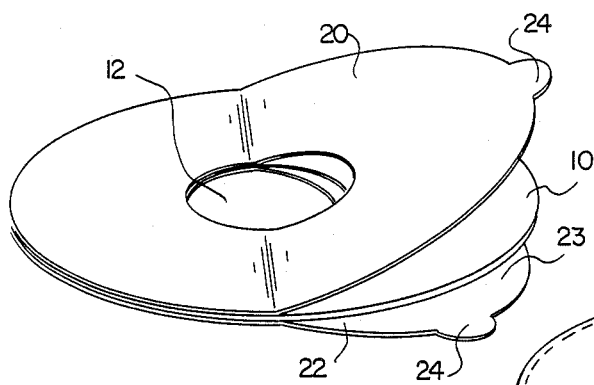
FIG. 3 is a perspective view of the disc protector of FIG. 1 illustrating removal of its protective layers.

A disc protector 10 according to the present invention is shown in FIGS. 1–3. Disc protector 10 is a circular sheet of material as will be more fully described below, having a central circular hole 12. A thin coating of adhesive is applied to surface 19 of disc protector 10 in annular regions 14 and 16. Inner annular region 14 is adjacent to center hole 14, whereas outer annular region 16 is adjacent to outer circumference 11. Adhesive is confined to annular regions 14 and 16 so that, when disc protector 10 is applied to an optical disc as hereinafter described, the adhesive will not be positioned over areas of the optical disc containing data.

Disc protector 10 is itself protected during handling prior to application to a disc by protective layers 20 and 22 applied to surfaces 18 and 19, respectively. Layer 22 is retained in position by adhesive rings 14 and 16. Surface 23 of protective layer 22 is suitably finished such that it may be readily separated from adhesive rings 14 and 16 without removing the adhesive from surface 19 of disc protector 10. Surface 21 of protective layer 20 is coated with a low-tack adhesive so as to be retained on surface 18 and yet be easily peeled away from disc protector 10 without leaving any residue. Protective layers 20 and 22 are preferably differentiated by means such as color so that a consumer can readily distinguish which layer covers adhesive rings 14 and 16. One or both of layers 20 and 22 also preferably includes tab 24 extending beyond outer circumference 11. Tabs 24 may be readily grasped by a consumer to facilitate removal of layers 20 and/or 22 from disc protector 10.

The material from which disc protector 10 is made must be scratch resistant. Since data is read optically from an optical disc, it is also important that disc protector 10 be made of a material having optical properties that minimize the distortion and attenuation of encoded light signals passing there through. In particular, disc protector 10 must be highly transparent at the wavelength of the laser employed by an optical disc reader/player. In a preferred embodiment of the present invention, disc protector 10 is made of cellulose triacetate film with a thickness of approximately 0.125 mm. The transparency of this material has been measured to be approximately 92% at wavelengths in the region of 0.4 to 0.5 microns.

Figure 4:
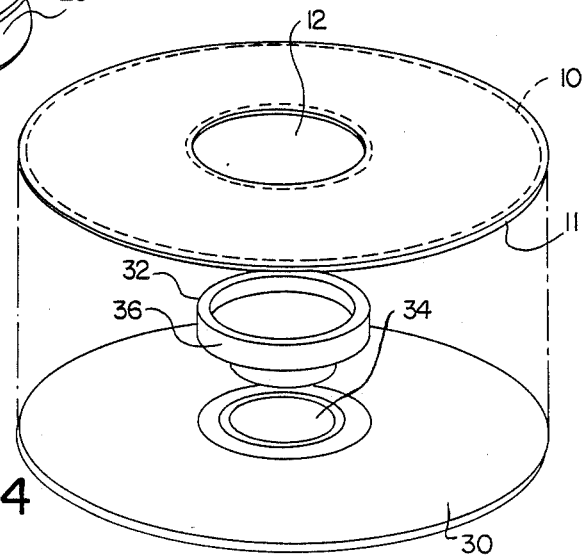
FIG. 4 illustrates the application of the disc protector of FIG. 1 to a compact disc.

Application of disc protector 10 to an optical disc such as compact disc (CD) 30 is illustrated in FIG. 4.

Protective layer 22 is first removed from disc protector 10 to expose adhesive rings 14 and 16. In order to facilitate concentric alignment of disc protector 10 with CD 30, centering adapter 32 is inserted into center hole 34 of CD 30. Shoulder 36 of centering adapter 32 is approximately the same size as center hole 12 of disc protector 10, but sufficiently smaller so that disc protector 10 fits over shoulder 36 without interference. Once centering adapter 32 is positioned on CD 30, disc protector 10 is positioned over CD 30 with adhesive rings 14 and 16 facing CD 30. Disc protector 10 is then placed in contact with the surface of CD 30 with shoulder 36 of centering adapter 32 protruding through center hole 12. Disc protector 10 is next pressed firmly against CD 30 by rubbing outwardly away from center hole 12 towards circumference 11. Finally, centering adapter 32 and protective layer 24 are removed.

The adhesive applied to annular rings 14 and 16 is sufficiently strong to hold disc protector 10 in place on disc 30 during normal handling, but yet allows disc protector 10 to be easily removed in the event that replacement is necessary.

It will be recognized that the above described invention may be embodied in other specific forms without departing from the spirit or essential characteristics of the disclosure. Thus, it is understood that the invention is not to be limited by the foregoing illustrative details except as set forth in the appended claims.

I claim:

1. In combination an optical disc having substantially flat opposing surfaces and a protective cover therefor comprising:
    a substantially transparent annular sheet having a top and bottom surface and an inner and an outer circumference;
    an inner ring of adhesive applied to said bottom surface adjacent to said inner circumference; and
    an outer ring of adhesive applied to said bottom surface adjacent to said outer circumference;
    said bottom surface, when said protective cover is applied to said optical disc, being substantially in contact with one of said substantially flat opposing surfaces of said optical disc.

2. A protective cover for an optical disc having substantially flat opposing surfaces comprising:
    a substantially transparent annular sheet having a top and bottom surface and an inner and an outer circumference;
    an inner ring of adhesive applied to said bottom surface adjacent to said inner circumference; and
    an outer ring of adhesive applied to said bottom surface adjacent to said outer circumference.
    said bottom surface, when said protective cover is applied to said optical disc, being substantially in contact with one of said substantially flat opposing surface of said optical disc, and further comprising a first peelable layer on said top surface and a second peelable layer on said bottom surface.

3. The protective cover of claim 2 wherein at least one of said first and second peelable layers includes a tab portion extending beyond said outer circumference of said substantially transparent annular sheet.

4. The protective cover of claim 2 wherein said outer circumference of said substantially transparent annular sheet is approximately coincident with an outer circumference of the optical disc.

5. The protective cover of claim 2 wherein said substantially transparent annular sheet is made of cellulose triacetate.

6. The protective cover of claim 5 wherein said substantially transparent annular sheet has a thickness of approximately 0.125 mm.

* * * * *